United States Patent [19]

Onaka et al.

[11] Patent Number: 5,194,319
[45] Date of Patent: Mar. 16, 1993

[54] SHAPED POLYAMIDE ARTICLES AND PROCESS FOR MANUFACTURING THE SAME

[75] Inventors: Hidemitsu Onaka, Hofu; Hitoshi Tatsuno, Nishinomiya; Kazuyuki Fukazawa; Masahiro Yamabe, both of Hofu, all of Japan

[73] Assignee: Kanebo, Ltd., Tokyo, Japan

[21] Appl. No.: 791,947

[22] Filed: Nov. 13, 1991

Related U.S. Application Data

[63] Continuation-in-part of Ser. No. 295,977, Jan. 11, 1989, abandoned.

Foreign Application Priority Data

Mar. 7, 1988 [JP] Japan .................................. 63-52931
Dec. 23, 1988 [JP] Japan .................................. 63-327465

[51] Int. Cl.⁵ .............................................. D03D 3/00
[52] U.S. Cl. .................................. 428/224; 428/364; 428/372; 525/425
[58] Field of Search ................. 428/364, 372, 224; 525/425; 106/499

[56] References Cited

U.S. PATENT DOCUMENTS

| | | | |
|---|---|---|---|
| 3,386,967 | 6/1968 | Twilley | 525/425 |
| 3,655,821 | 4/1972 | Lofquist | 525/425 |
| 4,150,674 | 4/1979 | Yung | 525/425 |
| 4,174,358 | 11/1979 | Epstein | 525/425 |
| 4,294,749 | 10/1981 | Papenfuhs et al. | 524/90 |
| 4,405,734 | 9/1983 | Fuchs et al. | 524/90 |
| 4,844,987 | 7/1989 | Hirose et al. | 428/474.4 |

*Primary Examiner*—Patrick J. Ryan
*Assistant Examiner*—N. Edwards
*Attorney, Agent, or Firm*—Flynn, Thiel, Boutell & Tanis

[57] ABSTRACT

A shaped polyamide article, particularly of a fibrous structure or a film, is made of a polyamide containing at least one additive selected from the group consisting of dyes, pigments and modifying additives and specified polyesters derived from an alkylene dicarboxylic acid and diethylene glycol. A process for manufacturing the shaped polyamide article includes the steps of: compounding a molten polyamide with a liquid mixture containing the above defined additive and the above defined polyester as a vehicle; and melt-shaping the resulting compound.

6 Claims, 1 Drawing Sheet

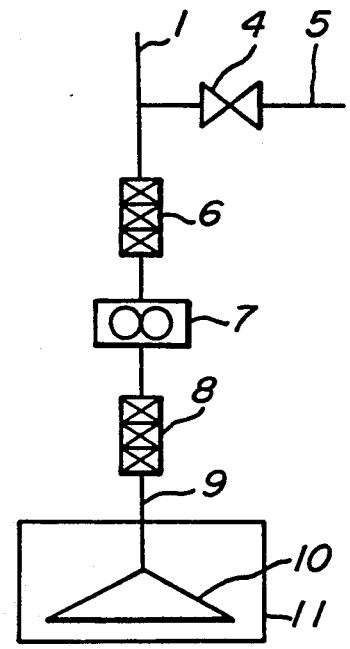
FIG_1
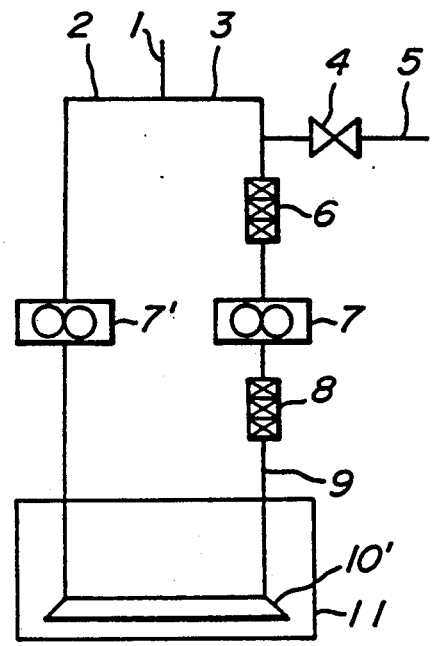
FIG_2
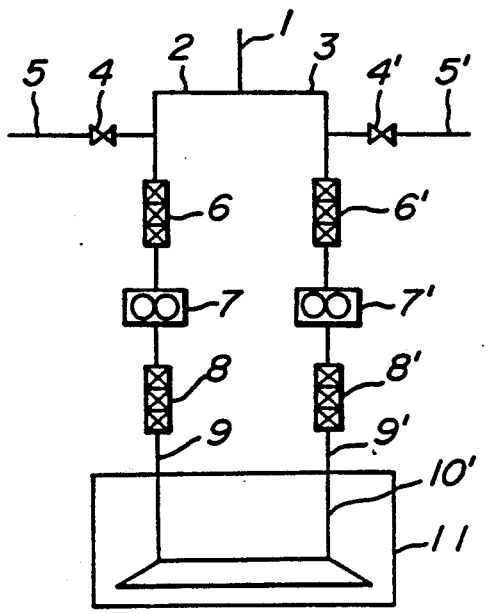
FIG_3

SHAPED POLYAMIDE ARTICLES AND PROCESS FOR MANUFACTURING THE SAME

CROSS-REFERENCE TO RELATED APPLICATION

This application is a continuation-in-part of copending Application Serial No. 295,977, filed January 11, 1989, now abandoned.

BACKGROUND OF THE INVENTION

1. Field of the Invention

The present invention relates to shaped polyamide articles, such as fibers, films, sheets or the like, containing dyes, pigments or modifying additives, and processes for manufacturing the same which are excellent in melt-molding performance.

2. Prior Art

As a process for mass-coloring thermoplastic fiber-forming polymers represented by polyethylene terephthalate and nylon-6, a process wherein pigments or dyes are admixed during the polymerization reaction and a color concentrate process wherein pigments or dyes in a high concentration are dispersed in the polymer have heretofore been well-known. However, as for the former, the colorants in practical use are limited to pigments having a good heat resistance, such as titanium dioxide, carbon black or the like, because of high temperatures in the reaction system. In addition, it has drawbacks such that installation of an exclusive autoclave is required because of staining of the autoclave and that lots of expense and labor are required for cleaning.

As for the latter, in the manufacture of color concentrate, drying of polymers before processing and drying of the color concentrate after processing are required, so that energy consumption is large. Particularly in the case of polyamides, there are disadvantages that properties of melt-spun fibers, such as tensile strength, elongation or the like, deteriorate or that knots (polymer agglomerates) are formed along the filaments, owing to the thermal history experienced in kneading and drying processes.

Alternatively, a dry coloring process wherein pigments or dyes are kneaded directly with a polymer is also known. However, it has difficulties caused by powdery pigments or dyes such that drying is hardly performed, pigments or dyes fly and dispersibility is poor. In any case, cleaning of spinning lines and drying equipment is required in the case of color changing, so that this process is difficult to adapt to frequent color changings.

The inventors paid their attention to the use of a liquid coloring mixture as a measure for obviating the above drawbacks of the coloring processes. A liquid coloring mixture is usually prepared by kneading a pigment or dye with a liquid vehicle at normal temperature and a constant quantity of this mixture is fed by a gear pump or plunger pump and compounded with a polymer in a molten state. This liquid coloring mixture has been applied to polyolefins such as polyethylene, polypropylene or the like, ABS resins and polyesters (for example, as described in Japanese Patent Application Laid-open Nos. 60-45,689 and 61-9,453). However, for polyamides, it has been found that only Japanese Patent Application Laid-open No. 59-75,926 and U.S. Pat. No. 4,167,503 disclose the use of polyoxyethylene alkyl phenylethers as a vehicle and Japanese Patent Application Laid-open No. 63-92,717 discloses polyamide fibers mass-colored with a liquid colorant comprising an isoindolinone pigment, a metal stearate and a vehicle (preferably, a polyester-ether). As a result of an investigation of the above conventional techniques, the inventors have found that polyamide fibers or films manufactured according to those conventional techniques still present problems, such as migration of or staining by dyes and pigments, bleeding of vehicles, opacification of fibers or films, filament breakage due to poor dispersibility or compatibility of dyes and pigments, or the like. Thus, in the present situation, excellent liquid coloring mixtures for polyamides have not yet been developed and, therefore, mass-colored polyamide fibers, sheets or films are scarcely in commercial production.

SUMMARY OF THE INVENTION

In view of these circumstances, as a result of an assiduous study on the melt-shaping ability of polyamides incorporated with a liquid mixture of a dye or pigment and a modifying additive, the inventors have accomplished the present invention.

The present invention is a shaped polyamide article, such as fibers, yarns and fabrics, which is characterized by comprising a polyamide, a coloring agent selected from the group consisting of dyes, pigments and mixtures thereof, and a vehicle comprising a polymer constituted by a main component having a recurring unit represented by formula (I):

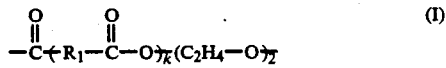

Wherein k is a positive integer, $R_1$ is $-C_mH_{2m}-$, with m being an integer from 2 to 12.

The article according to the present invention may additionally comprise a modifying additive selected from the group consisting of organic carboxylic acids, zeolite particles, flame retardants, reinforcement agents, antistatic agents, infrared ray radioactive particles, electroconducting particles, heat stabilizers, light stabilizers, catalyzers and mixtures thereof.

Further, the process for manufacturing the shaped polyamide article according to the present invention is characterized by comprising the steps of: compounding a molten polyamide with a liquid mixture containing a coloring agent selected from the group consisting of dyes, pigments and mixtures thereof, and a vehicle comprising a polymer constituted by a main component having a recurring unit represented by formula (I):

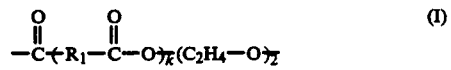

Wherein k is a positive integer, $R_1$ is $-C_mH_{2m}-$, with m being an integer from 2 to 12, and melt-shaping the resulting compound.

In the process according to the invention, the liquid mixture may additionally contain a modifying additive selected from the group consisting of organic carboxylic acids, zeolite particles, flame retardants, reinforcement agents, antistatic agents, infrared ray radioactive particles, electroconducting particles, heat stabilizers, light stabilizers, catalyzers and mixtures thereof.

BRIEF DESCRIPTION OF THE DRAWINGS

With reference to the accompanying drawing,

FIGS. 1~3 diagrammatically illustrate embodiments of shaping apparatuses suitably employed in the present invention.

DETAILED DESCRIPTION OF THE INVENTION

The present invention is applied preferably to dyes, pigments and modifying additives which have a melting point higher than that of a polyamide or have no melting point.

As a dye or pigment, any known dyes or pigments which have been hitherto used for shaped polyamide articles may be employable. However, particularly preferable ones for the object of the present invention are inorganic pigments such as various kinds of carbon black, titanium dioxide, calcium carbonate or the like, organic pigments, for example, phthalocyanine pigments such as Phthalocyanine Blue, Phthalocyanine Green or the like, perylene pigments such as Perylene Maroon, Perylene Red or the like, dioxazine pigments such as Dioxazine Flavathrone, Dioxazine Violet or the like, isoindolinone pigments such as Irgazin Yellow, Irgazin Red or the like, and a benzoxazole fluorescent brightener such as 4,4'-bis-(2-benzoxazolyl) stilbene and derivatives thereof. Most acidic dyes cannot clear hot water color-fastness tests at 60° C. and 70° C. (JIS L-0845-67) because of discoloration and staining, so that whether they are preferred will depend upon application fields of dyed articles.

As a modifying additive to be employed in the present invention, known modifying additives, such as organic carboxylic acids, zeolite particles, flame retardants, reinforcements, antistatic agents, infrared ray radioactive particles, electroconducting particles or the like, can be nonlimitatively employed. However, those modifying additives in powdery form are preferred in the present invention.

As an organic carboxylic acid, mention may be made of, for example, stearic acid, fumaric acid, isophthalic acid, terephthalic acid and the like. As an acid anhydride, mention may be made of phthalic anhydride, succinic anhydride, benzoic anhydride and the like. However, in any case, those having a good reactivity with the amino group of a polyamide and a boiling point higher than the melting point of the polyamide are preferred. Hard-yellowing or hard-dyeing polyamides can be obtained by incorporating a terminal amino group blocking agent into a polyamide in the spinning head to adjust the amino group content to a desired low level.

For obtaining yellowing resistant polyamides, amino groups are preferred to be reduced to 30 gram equivalent or less, more preferably 20 gram equivalent or less, per $10^6$ gram polymer. Alternatively, if it is intended to reduce the content of amino groups to less than 10 gram equivalent per $10^6$ gram polymer by adding an organic carboxylic acid, some amount of the added organic carboxylic acid remains as unreacted. The remaining organic carboxylic acid is not preferred because it induces a lowering in viscosity (polymerization degree) of the polyamides. Accordingly, an object of the present invention is to provide polyamides having an equivalent weight of amino groups of 10~30 gram equivalent, preferably 10~20 gram equivalent, per $10^6$ gram polymer. Further, the amount of the organic carboxylic acids to be added and reacted with amino groups is preferred to be decided to satisfy the following inequality (II):

$$30 \geq A - \frac{10^6 X}{M} \geq 10 \qquad (II)$$

where
- X : amount of the acids, etc.(g) to be added to 1 gram polyamide,
- M : molecular weight of the acids, etc., and
- A : equivalent weight of amino groups (gram equivalent per $10^6$ gram polymer) in the polyamide before addition.

The zeolite is generally an alumninosilicate having a three-dimensionally developed skeleton structure and, in general, represented by $xM_{2n}O.Al_2O_3.ySiO_2.zH_2O$, based on $Al_2O_3$. Here, M represents an ion-exchangeable metallic ion, usually a mono- or di-valent metal, and n corresponds to the valence. Meanwhile, x and y represent coefficients of metal oxides and silica, respectively, and z represents the molar number of the water of crystallization. Solutions of water soluble salts of germicidal metals, for example, silver, copper and zinc, readily exchange ions with the zeolite defined in the present invention. Therefore, utilizing such a phenomenon, the above described metallic ions that are needed can be supported alone or in combination on a zeolite fixing phase. However, it has been found that the zeolite particles supporting the metallic ions should satisfy two requirements: one is a specific surface area of 150 $m^2/g$ or more and another is an $SiO_2/Al_2O_3$ mole ratio of 14 or less. If these requirements are not met, the objective articles that achieve an effective germicidal function will not be obtainable. This is conjectured to be because of an insufficiency of an absolute amount of the metallic ions fixed on the zeolite, as in a state wherein they can exhibit the germicidal effect.

As a zeolite material having an $SiO_2/Al_2O_3$ mole ratio of 14 or less to be used in the present invention, either natural or synthetic zeolites can be employed. For example, as a natural zeolite, mention may be made of analcime ($SiO_2/Al_2O_3=3.6 \sim 5.6$), chabazite ($SiO_2/Al_2O_3=3.2 \sim 6.0$ and $6.4 \sim 7.6$), clinoptilolite ($SiO_2Al_2O_3=8.5 \sim 10.5$), erionite ($SiO_2/Al_2O_3=5.8 \sim 7.4$), faujasite ($SiO_2/Al_2O_3=4.2 \sim 4.6$), mordenite ($SiO_2/Al_2O_3=8.34 \sim 10.0$), phillipsite ($SiO_2/Al_2O_3=2.6 \sim 4.4$) and the like. These typical natural zeolites are suitable for the present invention. Alternatively, as a typical synthetic zeolite, mention may be made of A-type zeolite ($SiO_2/Al_2O_3=1.4 \sim 2.4$), X-type zeolite ($SiO_2/Al_2O_3=2 \sim 3$), Y-type zeolite ($SiO_2/Al_2O_3=318\ 6$), mordenite ($SiO_2Al_2O_3=9 \sim 10$) and the like. These synthetic zeolites are suitable as a zeolite material to be used in the present invention. Particularly preferable are the synthetic A-type, X-type, Y-type and synthetic or natural mordenite.

The zeolites are preferred to be in a powdery or particulate form, of which the particle diameter may be appropriately selected according to use. When they are applied to thick shaped articles, such as various containers, pipes, particulates, large denier fibers or the like, the diameter may be a few microns to several tens of microns. Alternatively, when fine denier fibers or thin films are shaped, the particle diameter is preferred to be as small as possible, for example, in the case of fibers for clothing, usually 5 microns or less, preferably 2 microns or less, and more preferably 1 micron or less.

As a flame retardant agent, any known fire retardant agent which has been hitherto used for shaped polyamide articles can be employed. However, particularly preferable ones are antimony trioxide, melamine cyanurate resins, decabromo-diphenylether, brominated polystyrenes, bisphenol-A tetrabromide, and the like.

As a reinforcement agent, any known powder reinforcing agents which have been hitherto used for shaped polyamide articles can be employed. However, ground products or the like, in particular, talc, various clays, mica, metallic powder, ceramic powder, porcelain powder, grindings of glass fibers or carbon fibers can be adequately selected to improve the heat resistance and stiffness of the shaped articles and, besides, to provide various other functions.

Infrared ray radioactive particles are particles which effectively radiate infrared rays, for example, those having an average infrared ray radiation dose rate at 50° C. in the wave range of 4~25 μm of at least 50%. The infrared ray radiation dose rate is a percent radiation intensity against the radiation intensity of the black body. For the object of the present invention, the average radiation dose rate of the infrared ray radiation particles is preferably at least 60%, most preferably at least 70%. In particular, particles of alumina ($Al_2O_3$), mullite ($1~2Al_2O_3$-$SiO_2$), zirconia ($ZrO_2$), zirconium carbide (ZrC), magnesia (MgO) or the like, having a purity as high as, for example, at least 95%, particularly at least 99%, are most preferred because these have the above average radiation dose rate of at least 75%.

As an antistatic agent, reaction products of an alkylene oxide adduct of glycerine and/or trimethylol propane with an alkylester of a dicarboxylic acid are preferred. Those reaction products having an average molecular weight of 5,000~60,000 wherein the alkylene oxide adduct is a random or block addition polymer of ethylene oxide and propylene oxide and the alkylester of a dicarboxylic acid is an alkylester of an aromatic dicarboxylic acid are more preferable.

As a polyamide to be used in the present invention, mention may be made of general purpose nylons, such as nylon-6, nylon-66, nylon-610, nylon-11, nylon-12, or the like, as well as copolyamides or mixtures thereof and the like. However, in any case, those excellent in shaping ability, for example, nylon-6, nylon-66 and nylon-12, are preferred.

The vehicles to be employed in the present invention are polymers constituted by a main component, namely, a structural component occupying at least 60%, preferably at least 80%, having a recurring unit represented by the formula () shown hereinbefore. The vehicles are polymers generally having a molecular weight of 1,000~60,000, preferably 10,000~25,000. Preferred examples of the vehicles are condensation polymerization products of succinic acid with diethylene glycol, adipic acid with diethylene glycol and caprolactone with diethylene glycol. If the structural component shown in the formula (I) comprises a polyether having more than 2 ethylene oxide moieties, such as triethylene oxide, polyethylene oxide or the like, the polymers a inferior in melt-shaping ability supposedly due to generation by thermal decomposition at high temperature of volatile substances. In order to provide liquid mixtures wherein the above-described dyes, pigments and various modifying additives are dispersed in a high concentration, the vehicles are desired to be in a liquid state at room temperature and, further, to have a viscosity as low as possible, for example, 20 poises or less at 75° C. In addition, vehicles having an acid value of 4 or less and a hydroxyl value ranging from 30~50 are preferred for their superiority in stability during compounding and shaping.

The liquid mixtures comprise generally 1~50% of the above-described dyes, pigments, etc. and 99~50% of the vehicle, by weight. Further, the liquid mixtures may contain modifying additives such as heat stabilizers, light stabilizers, catalyzers and the like, and in this case the above range for the additives may be widened a certain extent.

The liquid mixtures according to the present invention are pressurizedly fed at a constant rate by using a gear pump, plunger pump or the like into a polyamide in a molten state and compounded therewith. For effecting the constant rate pressurized feeding, the liquid mixtures are required to exhibit fluidity from room temperature to a shaping temperature. A viscosity higher than 30,000 poises at normal temperature is not preferred because it will affect accuracy in measuring. Further, compounding with polyamides is preferably conducted right before a spinneret or die of each shaping head of shaping apparatuses used for usual melt-spinning or melt-extruding processes. The flow passage to the spinneret or die is preferred to be as short as possible. In addition, for achieving a sufficient kneading after compounding of the polyamide and the liquid mixture, it is desirable to use static mixer elements that do not require any known moving parts. As a static mixer element, there are known "Static Mixer" manufactured by Kenix, U.S.A., "Square Mixer" by Sakura Seisakusho, "Honeycomb Mixer" by Tatsumi Kogyo, "T.K.-ROSS ISG Mixer" by Tokushu Kika Kogyo, etc. In any case, for achieving a sufficient kneading to produce homogeneous dispersion, it is practically preferred to use 15~60 elements. After kneading, shaped articles are produced by a usual melt-shaping process.

In FIGS. 1~3, a molten polyamide is introduced from an inlet passage 1 into a shaping apparatus, where the polyamide flows into branched passages 2, 3, if required (as shown in FIGS. 2 and 3). The liquid mixture, comprising dyes or pigments and/or additives and a vehicle, is pressurizedly fed through injection valve(s) 4 (and 4') from inlet passage(s) 5 (and 5'). Those flows are mixed by means of static mixer elements 6, 8 and (6', 8') and measured by measuring gear pump(s) 7 (and 7'). Although in the embodiments shown in the FIGS., two static mixer elements 6, 8 are arranged before and after each measuring gear pump, either one of them will usually be enough. The polymer mixture is transferred through approach path(s) 9, (and 9') to a spinneret (or die) pack 11 where it is further mixed and extruded from a spinneret (or die) 10 (10') by a conventional method to form fibers films, sheets, etc.

In the embodiment shown in FIG. 2, the polymer flow is branched off into two lines. One line (right hand side in FIG.) is provided with an injection part 4, 5 for the liquid mixture and a spinneret 10' extrudes two polymer flows jointly or separately. In the embodiment shown in FIG. 3, the polymer is also branched off into two lines and each line is provided with an injection part and a measuring and mixing part, 4~9 or 4'~9'. If the shaping apparatuses shown in FIGS. 2 and 3 are employed, diversified multi-component shaped articles, such as sheath-core type composite fibers, side by side composite fibers, two component nonwoven fabric sheets, multi-layered films or the like, can be manufactured.

The invention will be explained in more detail by way of example. In the following examples, part and percent are all by weight unless otherwise specified. Further, in the examples, color fasteness to light, retention of strength and antibacterial properties are determined by the following measuring methods.

Color fastness to light

A swatch of 7 cm×7 cm was cut out from a dyed sample. A polyurethane foam 10 mm thick was cut into the same size and attached to the reverse side of the above swatch sample. The sample was then mounted on a fade-o-meter of which the inside was kept at 83° C. After exposure to light for 200 hours, the degree of discoloration was determined on the gray scale.

Retention of tensile strength of yarns

A yarn sample was mounted on a fade-o-meter of which the inside was kept at 83° C. After exposure to light for 200 hours, the retention of the tensile strength of the sample was determined.

Antibacterial properties

An extinction rate of the following bacteria was measured.

Using a suspension of Escherichia coli or Staphylococcus aureus, a test bacterial solution was diluted and adjusted to contain $2 \sim 4 \times 10^5$ bacteria/ml. Two tenths of a millimeter of this test bacterial solution was dropped on a shaped article. The bacterial solution was placed on the shaped article and left to act thereupon at 37° C. for 18 hours. After 18 hours, the shaped article was washed with physiological saline. The washing solution was made to 100 ml, in the aggregate. Then, 1 ml of the solution was dispersed in an agar culture medium and kept at 37° C. for 24 hours. Survival number of the bacteria was measured and the extinction rate was calculated.

COMPARATIVE EXAMPLE 1

A liquid polyester/ether having a viscosity at 75° C. of 400 cp and a molecular weight of about 10,000, that is a polycondensation reaction product of a polyether polyol random copolymer (molecular weight of about 1,000, ethylene oxide: propylene oxide =1:2) with dimethyl terephthalate, was used as a vehicle. Seventy five parts of the vehicle and 25 parts of a perylene pigment, C.I. Pigment Red 123 manufactured by Ciba Geigy, were mixed and kneaded to prepare a liquid colored mixture. Then, using a spinning apparatus as shown in FIG. 1, the mixture was pressurizedly fed from a melt-spinning head into a molten nylon-6 polymer having a polymerization degree of 180, and compounded with the polymer in such an amount that 0.8% of the pigment would be contained in the polymer. Then, spinning was conducted at a spinning rate of 1,200 m/min. to produce undrawn yarn of 224 denier/24 filaments in the form of 6 kg yarn package. During spinning, the extrusion pressure of the polymer varied in the range of $1 \sim 2$ times that of the usual nylon-6 and, frequently broken filaments occurred. The undrawn yarn was then drawn 3.2 times and formed into 2 kg yarn packages. During drawing, frequently broken filaments also occurred.

EXAMPLE 1

A liquid colored mixture was prepared using 75 parts of a polycondensation reaction product of adipic acid with diethylene glycol, having a molecular weight of about 16,000 and a viscosity at 75° C. of 800 cp, in lieu of the vehicle used in Comparative Example 1. Then, a colored polyamide drawn yarn was manufactured in the same manner as Comparative Example 1.

EXAMPLE 2

A liquid colored mixture was prepared using a polycondensation reaction product of caprolactone with diethylene glycol, having a viscosity at 75° C. of 600 cp, in lieu of the vehicle used in Example 1. Then, a colored polyamide drawn yarn was manufactured in the same manner as Example 1.

EXAMPLE 3

A liquid colored mixture was prepared using a polycondensation reaction product of succinic acid with diethylene glycol, having a viscosity at 75° C. of 900 cp, in lieu of the vehicle used in Example 1. Then, a colored polyamide drawn yarn was manufactured in the same manner as Example 1.

COMPARATIVE EXAMPLE 2

A liquid colored mixture was prepared using Comparative a polyethylene glycol nonyl phenylether (Neugen EA-80, manufactured by Dai-ichi Kogyo Seiyaku K.K.) in lieu of the vehicle used in Example 1. Then, a colored polyamide drawn yarn was manufactured in the same manner as Example 1.

With regard to the above Examples $1 \sim 3$ and Comparative Examples 1 and 2, yarn breakage rates at the spinning and drawing steps and tensile strength and elongation at the breakage of the drawn yarn are shown in Table 1.

EXAMPLES $4 \sim 6$ and COMPARATIVE EXAMPLE 3

Ninety eight parts of each of the vehicles used in Examples $1 \sim 3$ and Comparative Example 1 and 2 parts of a fluorescent whitener, 4,4'-bis(2-benzoxazolyl) stilbene (optical Brightener, manufactured by Eastman), were mixed and kneaded with a three-roll mill to provide a liquid mixture having a viscosity of about 100 poises and a specific gravity of about 1.2. Then, the liquid mixture was pressurizedly fed from a melt-spinning head into a molten nylon-66 polymer with a polymerization degree of 170, containing 0.43% of $TiO_2$, a white inorganic compound manufactured by Fuji Titanium, and compounded with the polymer in such an amount that 0.02% of the fluorescent brightener could be contained in the polymer.

TABLE 1

| | Comparative Example 1 | Example 1 | Example 2 | Example 3 | Comparative Example 2 |
|---|---|---|---|---|---|
| Yarn breakage rate in spinning (%) | 24 | 5 | 6 | 6 | 19 |
| Yarn breakage rate in drawing (%) | 18 | 4 | 5 | 4 | 11 |
| Tensile strength of drawn yarn | 3.7 | 4.7 | 4.8 | 4.8 | 3.8 |

TABLE 1-continued

| | Comparative Example 1 | Example 1 | Example 2 | Example 3 | Comparative Example 2 |
|---|---|---|---|---|---|
| (g/d) Elongation at break of drawn yarn (%) | 28 | 34 | 33 | 35 | 30 |

Then, the polymer was spun at a spinning rate of 1,000 m/min. into an underdrawn yarn of 224 deniers/24 filaments which was further drawn 3.3 times to obtain a white drawn yarn of 70 deniers/24 filaments.

EXAMPLE 7

A nylon-66 white drawn yarn containing 1.73% of $TiO_2$ and 0.02% of a fluorescent brightener, based on the nylon-66, was manufactured in the same manner as Example 4 above, except that a liquid mixture consisting of 40% $TiO_2$, 0.62% fluorescent brightener and 59.38% of the vehicle used in Example 1 was used.

COMPARATIVE EXAMPLES 4~6

By the so-called "dry coloring method", a fluorescent brightener was admixed with nylon-66 (containing 0.43% of $TiO_2$) in such an amount that 0.02% of the fluorescent brightener could be contained in nylon and a yarn was obtained by a usual melt-spinning process (Comparative Example 4).

Alternatively, a color concentrate pellet prepared by admixing and kneading % of the fluorescent brightener therewith was diluted by a factor of 100 and a yarn was obtained by the usual melt-spinning process (Comparative Example 5).

Alternatively, a yarn was produced in the same manner as Comparative Example 4, except that the fluorescent brightener was not added (Comparative Example 6).

With regard to the above Examples 4~7 and Comparative Examples 3~6, yarn breakage rates at spinning and drawing steps, whiteness, tensile strength and elongation at break of the drawn yarns were determined and a light-fastness test (JIS L-0842, for 20 hours) was conducted. The result is shown in Table 2.

As is clear from Table 2, the white mass-colored polyamide fibers according to the present invention retained excellent fluorescent whiteness of the fluorescent brightener, color-fastness to light, heat resistance and solvent resistance as well as a good weatherability such that any conventional post-dyeing processes have never been able to provide. The yarns according to the invention are substantially on the same level as usual yarns from the qualitative point of view.

EXAMPLES 8~11 and COMPARATIVE EXAMPLE 7

Fifty parts of the vehicle used in Example 1 above and 50 parts of phthalic anhydride were mixed and kneaded with a three-roll mill to provide a liquid mixture having a specific gravity of 1.27.

Then, the liquid mixture was pressurizedly fed from a melt-spinning head into a molten nylon-6 polymer having a relative viscosity ($\eta r$) of 2.79 and $NH_3$ groups of 42 g equivalent weight/$10^6$ g polymer, and compounded with the polymer in such an amount that the phthalic anhydride would be contained in the amounts shown in Table 3. Then, the polymer was forwarded to a spinneret taking 7 minutes and spun at a spinning temperature of 260° C. and a spinning rate of 1,000 m/min. into a 224 denier/24 filament undrawn yarn which was wound on a takeup roll. The wound undrawn yarn was further drawn 3.2 times to obtain a 70 denier/24 filaments drawn yarn.

Relative viscosities ($\eta_r$), contents of amino group, finenesses, tensile strengths, elongations at break and gas yellowing test results are shown in Table 3. For comparison of the gas yellowing test, there is also shown the test result for a nylon-6 drawn yarn having an $\eta_r$ of 2.78 and an $NH_3$ group content of 42 g equivalent weight/$10^6$ g polymer (Comparative Example 7).

As is seen from Table 3, in accordance with the present invention, hard-dyeable polyamide fibers and hard-yellowing polyamide fibers having a desired amino group content can be obtained and, in addition, polyamide fibers not differing in quality from usual polyamide fibers and excellent in uniformity of quality can be manufactured.

TABLE 2

| | Example 4 | Example 5 | Example 6 | Example 7 | Comparative Example 3 | Comparative Example 4 | Comparative Example 5 | Comparative Example 6 |
|---|---|---|---|---|---|---|---|---|
| Fluorescent whitener (%) | 0.02 | 0.02 | 0.02 | 0.02 | 0.02 | 0.02 | 0.02 | 0 |
| Yarn breakage rate in spinning (%) | 5 | 5 | 5 | 5 | 9 | 6 | 6 | 5 |
| Yarn breakage rate in drawing (%) | 4 | 4 | 4 | 4 | 6 | 5 | 6 | 4 |
| Tensile strength (g/d) | 5.6 | 5.5 | 5.6 | 5.6 | 5.4 | 5.4 | 5.4 | 5.7 |
| Elongation at break (%) | 38 | 37 | 37 | 37 | 35 | 34 | 35 | 38 |
| Whiteness (L value) | 92 | 92 | 92 | 94 | 91 | 90 | 90 | 88 |
| Color-fastness test | ○ | ○ | ○ | ○ | ○ | ○ | Δ~○ | X |
| Discoloration | No | No | No | No | No | Yes | Yes | No |

TABLE 3

| | Comparative Example 7 | Example 8 | Example 9 | Example 10 | Example 11 |
|---|---|---|---|---|---|
| Phthalic anhydride content (%) | — | 0.18 | 0.33 | 0.40 | 0.50 |
| Rel. viscosity ($\eta_r$) | 2.78 | 2.77 | 2.75 | 2.73 | 2.50 |
| Amino group (g eq/$10^6$ g polymer) | 42 | 30 | 20 | 13 | 11 |
| Tensile strength (g/d) | 5.1 | 5.0 | 4.9 | 5.0 | 4.5 |
| Elongation at break (%) | 42 | 40 | 39 | 39 | 37 |
| Hard-dyeability | X | ○ | ○ | ⊚ | ⊚ |
| Gas yellowing test | X~Δ | Δ | ○ | ○ | ○ |

Note: The relative viscosity ($\eta_r$) was measured at 25° C. of solution of 0.5 g polymer in 50 ml of 97.8% sulfuric acid.

EXAMPLES 12~15 and COMPARATIVE EXAMPLE 8

Fifty eight parts of the vehicle used in Example 1 above and 42 parts of the zeolite shown in Table 4 which had been dried at 200° C. for 7 hours under vacuum were mixed and kneaded to provide a liquid mixture. Then, the liquid mixture was admixed with a nylon-6 polymer in the same manner as Example 1 in such an amount that 2% of the zeolite would be contained in the polymer. Then, the polymer was melt-spun and drawn to form a 70 denier/24 filament drawn yarn. The thus obtained yarns contained Na as shown in Table 4.

Then, nylon tricot napped fabrics were produced from those yarns by a conventional process and dyed with a metal complex dye (central metals: Co, Cr) in a dye bath and under conditions as described below. The result of the measurement of color-fastness to light is shown in Table 4.

| Dye bath No. 1 | |
|---|---|
| Lanacin Yellow 2RL (trade name of a metallized dye having a central Co atom, manufactured by Sandoz) | 0.103% owf. |
| Lanacin Bordeaux RL (trade name of a metallized dye having a central Co atom, manufactured by Sandoz) | 0.0165% owf. |
| Lanacin Black BRL (trade name of A metallized dye having a central Cr atom, manufactured by Sandoz) | 0.06% owf. |
| Ammonium sulfate | 0.5 g/l |
| Neogen S-20 (trade name, manufactured by Dai-ichi Kogyo Seiyaku) | 2.0 owf. |
| Cellopol DR-80 (trade name, manufactured by Sanyo Kasei) | 0.6% owf. |
| Bath ratio: 30 times. | |
| Bath temperature: dyeing was conducted while the temperature was raised from 30° C. to 90° C. over 60 minutes and further kept at 90° C. for 45 minutes. | |

TABLE 4

| | Example 12 | Example 13 | Example 14 | Example 15 | Comparative Example 8 |
|---|---|---|---|---|---|
| Zeolite Type | $Z_1$ A | $Z_2$ X | $Z_3$ Y | $Z_4$ natural mordenite | — |
| Average particle dia. ($\mu$) | 1.1 | 1.6 | 0.6 | 2.0 | — |
| Theoretical Na content (wt. %) | 15.7 | 14.4 | 11.2 | 6.0 | — |
| Specific surface area ($m^2$/g) | 664 | 838 | 908 | 341 | |
| content in fiber (wt. %) | 2.0 | 2.0 | 2.0 | 2.0 | — |
| Na content in drawn yarn (wt. %) | 0.31 | 0.28 | 0.22 | 0.12 | |
| Color-fastness to light | 4 | 4 | 4 | 4 | 1~2 |

From Table 4, it has been found that the dyed articles composed of the polyamide fibers incorporated with zeolite according to the present invention and dyed with the metal complex dyes have an excellent color-fastness to light.

EXAMPLE 16 and COMPARATIVE EXAMPLE 9

Two hundred fifty grams of zeolite $Z_3$ used in Example 14 were admixed with 1 liter of 1/20M silver nitrate aqueous solution. Thus obtained mixture was retained at room temperature under stirring for 3 hours to effect ion-exchange. The silver-zeolite obtained by such an ion-exchanging process was filtrated and washed with water to remove excessive silver ions. The obtained silver-zeolite was treated by copper sulfate aqueous solution in the same manner as the above to obtain silver/copper-zeolite (zeolite $Z_5$). The obtained zeolite $Z_5$ had copper and silver contents of 2.75% and 1.04%, respectively, and a specific surface area of 875 $m^2$/g. Using the obtained silver/copperzeolite $Z_5$, a drawn yarn was manufactured in the same manner as Example 12. Metal contents in the drawn yarns were measured by an atomic-absorption spectrophotometer and X-ray fluorometry. The result is shown in Table 5.

TABLE 5

| Zeolite | Content in fiber (wt. %) | Metal content in drawn yarn (%) | | | | | Remarks |
|---|---|---|---|---|---|---|---|
| | | Na | Cu | Ag | Si | Co | |
| Ag/Cu-zeolite | 2.0 | 0.053 | 0.048 | 0.018 | 0.22 | — | before dyeing |
| | | 0.022 | 0.044 | 0.017 | 0.19 | 0.005 | after dyeing |

Then, a tricot napped fabric was manufactured in the same manner as Example 12 and dyed with the below-described metal complex dye (Dye bath No. 2). Metal contents in the resultant polyamide dyed fabric are shown in Table 5 above. Further, this polyamide fabric was measured for color fastness to light, retention of tensile strength and antibacterial properties. The result is shown in Table 6.

For comparison, a sample which did not contain the silver/copper-zeolite $Z_5$ was also dyed in the same manner as the above and the same measurement was conducted.

| Dye bath No. 2 | | |
|---|---|---|
| Dyestuff | Lanacin Bordeaux RL | 0.15% owf. |
| Dyeing aid: | ammonium sulfate | 0.5 g/l |
| | Neogen S-20 | 2.0% owf. |

-continued

| Dye bath No. 2 | |
|---|---|
| Cellopol DR-80 | 0.6% owf. |

Note: The bath temperature and bath ratio were the same as those in Example 12.

TABLE 6

| | Zeolite | Dye bath | Color fastness to light | Retention of tensile strength | Antibacterial property (%) |
|---|---|---|---|---|---|
| Example 16 | Ag/Cu-zeolite | Dye bath No. 2 | 4 | 73.5 | 100 |
| Comparative Example 9 | — | " | 1~2 | 15.0 | 0 |

From the result shown in Table 5, it has been found that when polyamide fibers containing the copper/silver-zeolite are dyed with a metal complex dye, copper, silver and silica contents are substantially constant, whereas only sodium is reduced from 0.053% to 0.022%. This proves the fact that when the polyamide fibers containing silver/copper-zeolites are dyed with a metal complex dye, the silver and copper are not ion-exchanged but only the sodium is ion-exchanged, so that the zeolite holds the metal complex dye.

Alternatively, from the result shown in Table 6, it has been found that dyed articles produced by dyeing polyamide fibers containing silver/copper-zeolite with a metal complex dye exhibit a good resistance to light as well as super-antifungal properties such as a fungi extinction rate of 100%.

EXAMPLE 17

Sixty parts of the vehicle used in Example 1 and 2 parts of carbon black were admixed with 40 parts of alumina particles having a degree of crystallization of 99%, an average particle diameter of 0.5 μm and an average radioactive rate at 50° C in the wave range of 4~25 μm of 83%, and a liquid mixture was obtained. Then, compounding of the liquid mixture with a nylon-6 molten polymer, spinning and fabricating of fabrics were conducted by using a spun-bond manufacturing apparatus.

The spun-bond manufacturing apparatus was equipped with a spinneret provided with 240 aggregate orifices with a diameter of 0.40 mm. The orifices were aligned in two rows and in each row adjacent orifices were 3 mm apart. The spinneret was further provided with rows of hot gas jet nozzles, aggregating 250, arranged alongside of the rows of orifices. A screen for collecting fibrous fleece which advanced with a traverse motion was provided 20 cm below the spinneret face.

The vehicle, i.e., a liquid mixture, was pressurizedly fed into the nylon-6 molten polymer in such an amount that 0.5% of carbon black and 10% of alumina particles would be contained in the polymer. Then, a nonwoven fabric sheet having a width of 140 cm, a unit weight of 50 g/m² and fineness of a single filament of about 1 denier was manufactured.

A sheet 15 cm long cut out from the above nonwoven fabric sheet was attached closely on the skin on an arm and rolled twice around the arm. Then, the temperature in the middle portion of the rolled sheet was measured with a thermocouple. The temperature 10 minutes after the commencement of the experiment measured 22° C. in the laboratory when the outdoor temperature was 10° C. Using a nonwoven fabric sheet manufactured in the same manner as the above, except that the liquid mixture was not compounded, the temperature measurement was conducted in the same way and the temperature measured 16° C. The above experiments proved that the nonwoven fabric sheet according to the present invention is excellent in heat insulation as compared with the conventional sheet.

As demonstrated by the foregoing Examples, the shaped polyamide articles of the present invention are provided with an excellent coloring ability or functionability as well as physical properties on the same level as usual shaped polyamide articles.

Further, in accordance with the process of the present invention, color changing and material changing can be performed relatively easily, so that the process has been much simplified as compared with conventional processes. In addition, the present invention has a feature that shaped polyamide articles excellent in uniformity of quality can be manufactured with good operatabilities of shaping and finishing.

What is claimed is:

1. A polyamide article selected from the group consisting of fibers, yarns and fabrics comprising a polyamide, a coloring agent selected from the group consisting of dyes, pigments and mixtures thereof, and a vehicle comprising a polymer constituted by a main component having recurring unit represented by formula (I):

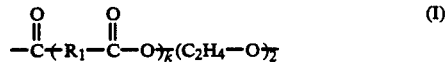

Wherein k is a positive integer, $R_1$ is $-C_mmH_{2m}-$, with m being an integer from 2 to 12.

2. An article as claimed in Claim 1, additionally comprising a modifying additive selected from the group consisting of organic carboxylic acids, zeolite particles, flame retardants, reinforcement agents, antistatic agents, infrared ray radioactive particles, electroconducting particles, heat stabilizers, light stabilizers, catalyzers and mixtures thereof.

3. An article as claimed in claim 1, wherein the recurring unit is formed from a polycondensation reaction between adipic acid and diethylene glycol.

4. An article as claimed in claim 1, wherein the recurring unit is formed from a polycondensation reaction between caprolactone and diethylene glycol.

5. An article as claimed in claim 1, wherein the recurring unit is formed from a polycondensation reaction between succinic acid and diethylene glycol.

6. An article as claimed in claim 1, wherein the coloring agent has a higher melting point than the polyamide.

* * * * *